Figure 1:
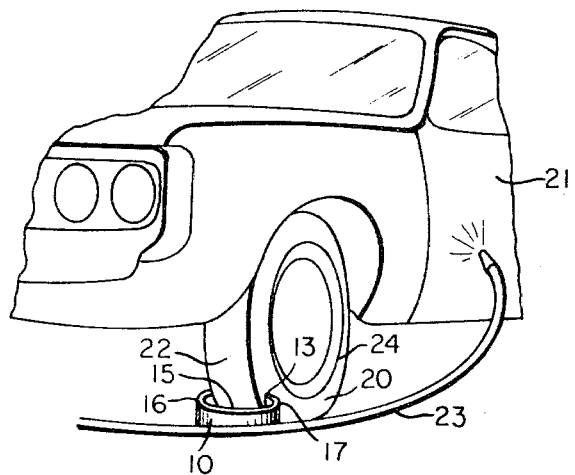

United States Patent [19]
Kline

[11] 3,754,305
[45] Aug. 28, 1973

[54] AUTOMOBILE TIRE CLAMP THAT PROVIDES FREE HOSE MOVEMENT AROUND A CAR

[76] Inventor: John H. Kline, 58 Holly St., Wilmington, Del. 19808

[22] Filed: May 27, 1971

[21] Appl. No.: 147,476

[52] U.S. Cl. .................................................. 24/256
[51] Int. Cl. ............................................ A44b 21/00
[58] Field of Search .................. 24/255 C, 255 VA, 24/256, 848, 259 C, 255 G, 259 SP, 255 SP, 68 TT, 69 TT, 70 TT, 255 SL

[56] References Cited
UNITED STATES PATENTS

| 785,822 | 3/1905 | Mitchem ........................ 24/256 UX |
| 1,533,970 | 4/1925 | Campbell et al .................. 24/256 X |
| 3,629,912 | 12/1971 | Klopp .............................. 24/255 SL |
| 1,806,840 | 5/1931 | Campbell ......................... 24/84 B X |
| 2,166,869 | 7/1939 | Lees et al ......................... 24/84 B X |

FOREIGN PATENTS OR APPLICATIONS 924,381 3/1955 Germany ........................... 24/255 G Primary Examiner—Donald A. Griffin
Attorney—George W. Walker

[57] ABSTRACT

A clamp that can be attached to the tire of an automobile to provide a smooth curved substantially verticle wall in front of and to the sides of that part of the wedge-shaped space formed by the tire and the ground that tends to wedge and stop the movement of a hose as it is pulled around the front or rear of a car, as well as the combination of the clamp and the tire.

3 Claims, 2 Drawing Figures

Patented Aug. 28, 1973

3,754,305

INVENTOR
JOHN H. KLINE

BY George W Walker
ATTORNEY

AUTOMOBILE TIRE CLAMP THAT PROVIDES FREE HOSE MOVEMENT AROUND A CAR

This invention relates to a clamp and its use for preventing a hose from wedging itself under the front or rear tire of an automobile when the hose is pulled around the front or back of the car.

The operator of a paint spray in an automobile refinishing or body shop moves around the car dragging on the floor the air hose used for supplying the air for spraying the paint. While concentrating on the spraying of the automobile finish, the operator also must keep in mind the fact that the air hose may become wedged under the back or the front tire of the car when it comes in contact with the tire. The wedging of the hose and the sudden stopping of its movement causes the paint spray to be stopped in its sweeping motion. This stopping of the motion of the paint spray causes a build-up, a run or a sag of the finish on the car which is undesirable. The build-up, run or sag can only be corrected by added labor in sanding of lacquer and respraying or in the case of enamel by removing the finish from the entire panel and respraying. For this reason it is the practice of the operator to anticipate the possibility of wedging and stop the spraying to adjust the hose. This action on the operator's part requires that time and attention be given to the hose and hence draws attention away from the job of spraying the car.

The problem of wedging and stopping the motion of a hose also arises when washing the car with a garden hose although this is more of a nuisance and does not actually affect the washing of the car.

Blocks or chucks have been used to prevent such wedging but these have proven to be unsatisfactory as they tend to move when least expected. Hence, these are not acceptable as means for avoiding the wedging and stopping of the free motion of a air hose during the paint spraying of an automobile.

The present invention overcomes these difficulties by providing a grip or clamp that can be attached to the tire of an automobile to provide a smooth curved substantially vertical wall in front of and to the sides of that part of the wedge-shaped space formed by the tire and the ground (or the floor) that tends to wedge and stop the movement of a hose as it is pulled around the front or rear of the car.

It is preferred that the grip or clamp of this invention be in the shape of a "C" and made of a band having a width of at least one inch (corresponding to the height of the substantially vertical wall referred to above) said "C" having an apparent diameter of at least 5 inches and said clamp or grip being sufficiently strong, as a clamp, to apply a gripping force on the tire of at least 1½ pounds.

This invention also comprises the applying of the clamp to the tire as well as the combination of the tire of the automobile and the clamp.

Figure 2:
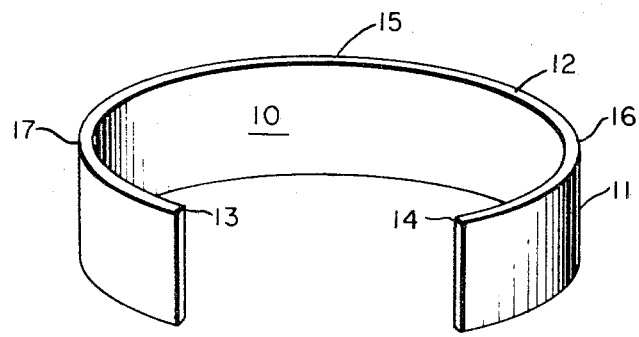

An embodiment of the clamp and its use on the tire is illustrated in the accompanying sheet of drawings in which:

FIG. 1 is a diagrammatic view of the clamp on the tire of an automobile and in use with a hose; and FIG. 2 is a perspective view of the clamp.

Referring to FIG. 1 the clamp 10 is fixed to the tire 20 of the automobile 21 by the gripping force of the pointed edge 13 of the clamp 10 that comes in contact with the tire and the opposite pointed edge 14 (see FIG. 2) not shown in FIG. 1. The top 15 of the wall of the clamp touches the tread 22 of the tire 20. As the clamp is flat against the floor or ground and extends outward at its sides 16 and 17 it prevents the hose 23 from becoming wedged under the tire 20 when the hose is moved.

FIG. 2 illustrates a clamp which is circular when relaxed. In its preferred embodiment it is made from acrylonitrile-butadiene-styrene pipe grade polymer. A clamp of this material would preferably have a thickness 12 of about three-sixteenths inch and a wall height or band width 11 of about 2 inches.

The diameter, e. g. the distance between points 16 and 17, would depend on the size of the tire on which the clamp is used as well as on the size of the opening between points 13 and 14. For most passenger car tires a clamp having a diameter of about 6 inches is suitable with an opening between points 13 and 14 of about 3¼ inches. Such a clamp will exert a pressure on the side of the tire between points 13 and 14 of an amount of about 1½ pounds to about 8 or 9 pounds if the opening between points 13 and 14 is extended to from about 3¾ inches to about 7 inches.

In the measuring of the force exerted by the clamp against the tire a spring scale was used to lift one side of the clamp away from the tire. The reading on the scale when one side of the clamp no longer touches the tire is considered to be the clamping force.

When the clamp described above is applied to a tire so as to exert a force of 8 to 9 pounds this force is exerted over an area of about one-twentieth of a square inch. Hence, the actual pressure in pounds per square inch on the side of the tire is of the order of a 160 to a 180 psi. As this force is exerted on the tire below the widest portion 24 of the sidewall of the tire and as points 13 and 14 tend to dig into the sidewall, the clamp, when in use, cannot be dislodged from its positon to cause the points 13 and 14 to move upward and the clamp to encircle the tire.

The clamp is applied by placing it on the floor so that the wall 11 is perpendicular to the floor and the opening between 13 and 14 is facing the tread of the tire. Force is then applied to increase the opening between 13 and 14 sufficiently to slip the clamp over the sides of the tire and the clamp is slid on the floor in the flat position towards the tire until the top of the wall 11 in back of the opening touches the tread of the tire. The force stretching the clamp open is then released to permit the clamp to grip the sides of the tire. It has been found that such a clamp cannot be dislodged by movement of a hose even when there are knots or couples in the hose. It has also been found that the grip is effective when the force is as low as 1½ to 2 pounds.

The plastic grip or clamp may be molded or it can be made by cutting a two inch section length from a 6 inch diameter soil pipe and then cutting about 3½ inches out of the wall of the circular pipe section.

While spring grade metal may be substituted for plastic it is considered to be less desirable. Most metals other than bronze or stainless steel would rapidly corrode under conditions of use unless coated with a non-corrosive coating. Furthermore, metals may cause sparks as the clamps are being placed or removed hence creating a fire hazard in a paint shop. Accordingly, the use of plastics is preferred.

It is well known that plastics will flow under stress and are softened by organic solvents. Accordingly it is considered surprising that plastics can be used to make the clamp of this invention particularly for use in automobile body refinishing shops.

The plastic clamps described herein have been found to be sufficiently flexible and elastic to return substantially to their original shape after use so that they can be used many times. Polymers that can be used include pipe grade vinyl polymers, e. g. poly vinyl chloride and polyethylene and acetyl resins as well as acrylonitrile-butadiene-styrene pipe grade polymers. In fact any plastic having the flexibility and elasticity of these plastics and which would be suitable for use as a plastic pipe can be used.

The "C" clamp of this invention should have a wall of sufficient thickness to provide a force of at least 1½ pounds pressing against the side of the tire. The height of the wall of the clamp should be greater than the diameter of the hose and in this respect it is considered that the walls should be at least 1 inch high.

The force applied by the clamp is primarily applied through points or edges touching the tire. It is preferable that these contact the tire at a point on the tire at least slightly below the widest point of the tire. This factor taken into consideration with the diameter of the clamp would of course control the height of the wall of the clamp. In general, the height of the wall or width of the band should be less than about 3 inches for tires of passenger cars.

Clamps to be used on passenger cars should have a relaxed diameter of about 5 to 8 inches, a wall height of 1 to 3 inches and a gripping force of at least 1½ pounds to about 30 pounds when applied to the tire. Depending on the plastic used the thicknes of the wall may vary from one-eighth inch to three-eighths inch provided, of course, it satisfies the gripping forces required. The edges of the clamp at the opening need not be parallel but can take any form provided the force is exerted on the tire at the edge and preferably at a point on the edge.

While the preferred embodiment of the clamp is in the form of a circular type "C" it is obvious that "C" clamps may be elliptical in the relaxed positon and that the opening may be at any point in the wall so that the clamp may be either in the form of a flat "C" or an elongated "C".

As many apparently widely different embodiments of this invention may be made without departing from the spirit and scope thereof it is to be understood that this invention is not limited to the specific embodiments thereof except as defined in the appended claims.

I claim:

1. A clamp for preventing a hose from becoming wedged under the front or rear tire of an automobile when the hose is pulled around the front or back of the car by providing a smooth curved substantially vertical wall in front of and to the sides of that part of the wedge shaped space formed by the tire and the ground that tends to wedge and stop the free movement of the hose, which comprises, a "C" shaped band having a width of at least one inch, the "C" form having a diameter of at least 5 inches and said clamp being of sufficient strength to apply a gripping force of at least one and a half pounds when the opening of the "C" is extended at least one half inch.

2. The clamp of claim 1. wherein the "C" shaped band has a diameter of 5 to 8 inches, a band width of 1 to 3 inches, a thickness of one-eighth to three-eighths inches and is composed of pipe grade polymer.

3. The clamp of claim 2 wherein the pipe grade polymer is a polymer of acrylonitrile-butadiene-styrene.

* * * * *